March 11, 1930.  C. T. WALLIS  1,750,337
SPEEDOMETER
Filed June 28, 1926
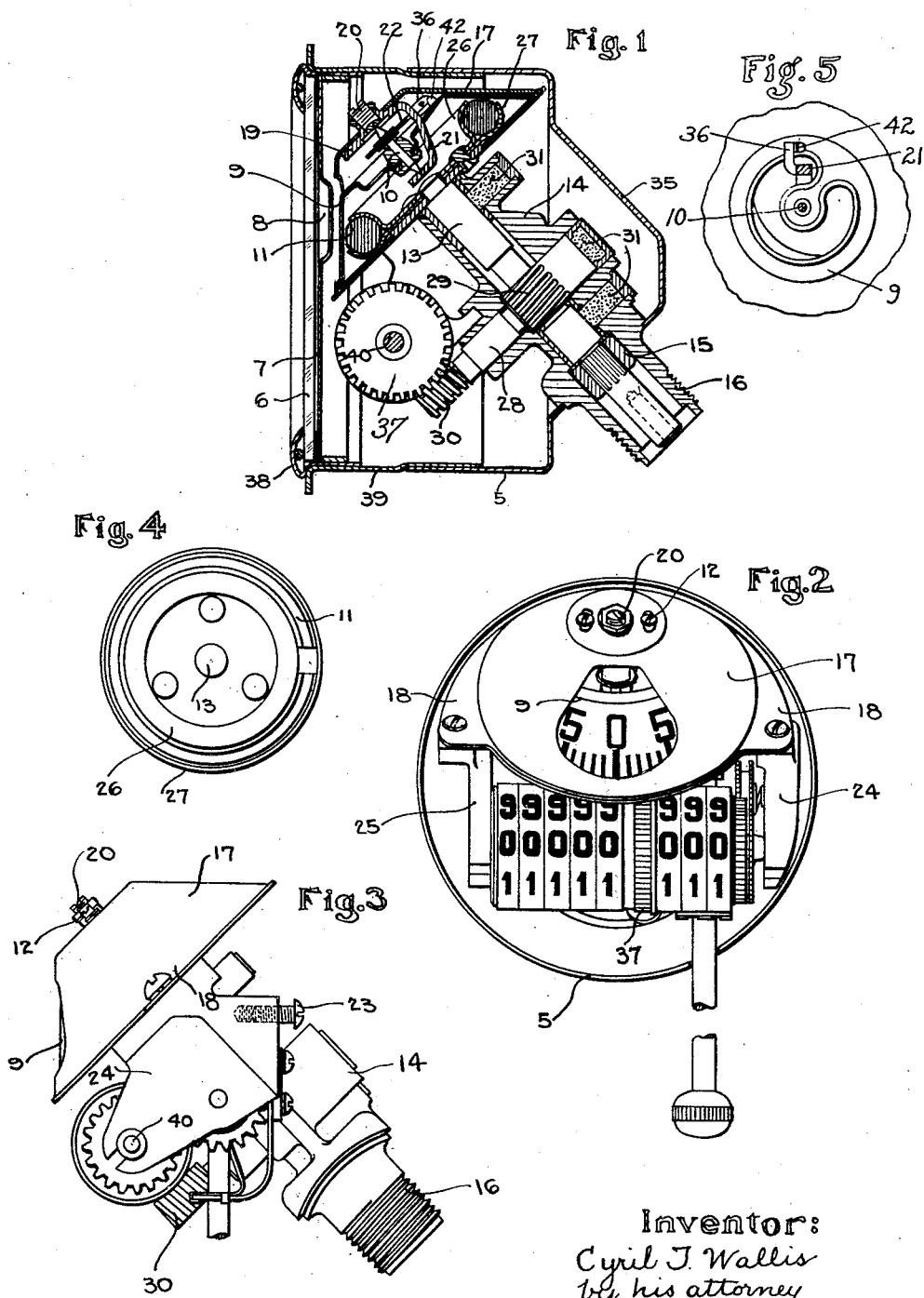
Inventor:
Cyril T. Wallis
by his attorney
Farnum F. Dorsey Patented Mar. 11, 1930

1,750,337

UNITED STATES PATENT OFFICE

CYRIL T. WALLIS, OF ROCHESTER, NEW YORK, ASSIGNOR, BY MESNE ASSIGNMENTS, TO NORTHEAST APPLIANCE CORPORATION, OF ROCHESTER, NEW YORK, A CORPORATION OF NEW YORK

SPEEDOMETER

Application filed June 28, 1926. Serial No. 119,070.

This invention relates to speedometers or tachometers of the type in which a pivoted indicator, provided with a series of speed indicating numerals, is turned, against the opposition of a spring, through an angle proportionate to the speed which is to be indicated, so as to bring the numerals successively into view at the front of the instrument.

In instruments of the type in question the turning force is usually applied to the indicator by means which create a rotating magnetic field, acting inductively upon the indicator, and the invention relates particularly to such magnetically operated instruments, although it is applicable, in some aspects, to instruments having a different mode of operation.

In speedometers, particularly as used upon motor vehicles and mounted upon the usual instrument-boards of such vehicles, it is customary to drive the rotating parts of the instrument by means of a flexible shaft, and this shaft is most conveniently arranged to enter the instrument either horizontally or at a downward and rearward inclination, through the back of the case of the speedometer. To provide a surface of sufficient extent for the indicating numerals and, at the same time, to avoid interference with the mechanism of the odometer, which is usually combined in the same case with the tachometer, it has been customary to use an indicator with a substantially cylindrical body, mounted to turn about a vertical axis. With such an indicator, in order that the driveshaft may enter the case from the rear, connection has to be made between the driveshaft and the rotary magnet through spiral or bevel gears or some form of flexible connection.

Gears and flexible connections, when used for the purpose just stated, not only add to the cost of the instrument, but are also undesirable by reason of the fact that they tend to become noisy in operation. The principal object of the present invention is to avoid the necessity of such means, without sacrificing any of the other desirable characteristics of an instrument of the type in question. Another object of the invention is to produce an instrument of simple, inexpensive and rugged construction, and particularly an instrument in which the several parts may be made up as simple and convenient assemblies, which can be readily removed or replaced for adjustment or repair. Other objects of this invention, and the means by which they are attained, will be set forth in connection with the description of the illustrated embodiment of the invention.

The features of construction by which the foregoing objects are attained will be set forth hereinafter, in connection with the description of the illustrated embodiment of the invention.

In the accompanying drawings, Fig. 1 is a side-elevation, partly in vertical section approximately at the median plane, of a speedometer embodying the present invention. Fig. 2 is a front-elevation of the instrument, with the front glass, the dial etc. removed to show the interior mechanism. Fig. 3 is a side-elevation of the mechanism and the frame of the instrument, removed from the case. Fig. 4 is an upper end-view of the rotary magnet and the parts by which it is supported; and Fig. 5 is a sectional view normal to the axis of the indicator, showing details of the indicator and its supporting means.

The invention is illustrated as embodied in an instrument having a case 5 drawn from sheet metal in generally cylindrical form, but with a conical projection 35 at the back. The forward end of the case is normally closed by a glass 6 secured by a bezel 38 and a mounting ring 39 attached to the case. Behind the glass is a sheet-metal face or dial 7, provided with a sight opening 8 through which the speed indicator is visible.

The indicator 9 has the general form of a truncated cone, and is provided with a central pivot staff 10, the pointed ends of which are mounted in pivot-bearings so that the indicator may turn on an axis downwardly and rearwardly inclined at an angle of about 45°. Since the included angle of the indicator is 90°, it results that the portion visible through the opening 8 is substantially vertical, and thus the significant figure on the indicator is always in a convenient position for observation.

The indicator is moved by means of a ring-shaped magnet 11, carried in a sheet metal shell made of brass or other non-magnetic material. This sheet comprises two members 26 and 27, having flat central portions which are secured together by rivets. The upper member 26 has a marginal flange which embraces the inner and upper part of the magnet, while the lower member 27 has a flange which engages the lower and outer part of the magnet. The magnet is thus securely held, while exposed at the part nearest to the indicator. The magnet-supporting shell is fixed on the upper end of a drive shaft, which turns in bearings in a frame 14. A collar 15, fixed near the lower end of the shaft, acts as a thrust member to prevent longitudinal movement, so that the clearance or air gap between the magnet and the indicator is held constant.

The lower rear end of the shaft projects through an opening in the lower part of the conical projection 35 at the back of the case, and at this point the frame is provided with a screw-threaded socket 16, adapted to receive a coupling member on the end of the usual sheath, in which a flexible shaft (not shown) may be enclosed, this shaft being connected with the end of the drive-shaft 13 in the usual manner.

The indicator is preferably made of aluminum, which combines lightness with good electrical conductivity, and it is turned by the inductive effect of the magnet, this turning motion being resisted by the usual hairspring 22 attached to the staff of the indicator. To enhance the inductive effect, the indicator is partially enclosed by a steel member 17 of generally conical form, which affords a path, of low reluctance, for the magnetic flux passing from one pole of the magnet to the other, through the indicator 9. This member 17, which may be called the "inductor", is provided at the front with an opening registering with the sight opening 8. It is also provided, at its lower edge, with two lateral lugs 18 which are screwed to suitable seats on the frame 14, to support the inductor rigidly in correct position.

In addition to its magnetic function, the inductor is utilized structurally, as a support for the indicator bearings. For this purpose a plate 19 is fastened, by screws 12, to the inner surface of the inductor, and the upper pivot bearing 20 is adjustably mounted in the plate. An arm 21, integral with the plate, carries the lower pivot bearing. The hair spring 22 is also attached, at its outer end, to the arm 21.

A detent 42 on the indicator is located in position to engage a stop-lug 36 projecting from the arm 21, so as to arrest the indicator at the zero position. Adjustment of the stop is desirable, in order that the indicator may return exactly to zero regardless of slight irregularities in manufacture, and novel means are provided for securing such adjustment. For this purpose provision is made for turning the plate 19, with the arm 21, about the pivotal axis. This is accomplished by making the openings in the inductor 17, through which the screws 12 pass, somewhat elongated as shown in Fig. 2, so that if the screws be loosened the required adjustment may be made.

It will be apparent that the inductor and the indicator constitute a unitary assembly in which the indicator is so well enclosed that the assembly may be handled with convenience and without danger of injury to the indicator or its pivot-bearings, owing particularly to the fact that the margin of the indicator is slightly above the lower margin of the inductor, so that the assembly may be placed upon a bench or tray without subjecting the indicator to any contact or strain.

The frame is provided with two forward lateral extensions 24 and 25, which are adapted for the support of an odometer. The construction and operation of the odometer are not particularly involved in this invention, but this part of the instrument has the general form of an assembly of cylindrical elements upon a central shaft 40, and the frame members 24 and 25 are horizontally slotted to receive central projections at the ends of the odometer assembly, so that this assembly may be readily mounted in, or removed from the frame by horizontal movement from the front. The odometer is actuated through a worm-gear 37, located between the number rings which constitute the trip-register and those of the season-register. A shaft 28 is journalled in the frame 14, at one side of the drive-shaft 13, and is provided with a gear-toothed portion 29 arranged to mesh with a worm (not shown), cut upon the adjacent portion of the drive-shaft. The lower forward end of the shaft 28 projects from the frame and is provided with a worm 30 which meshes with the worm-wheel 37, and thus actuates the odometer. The shafts 13 and 28 are both lubricated by means of absorbent packing 31 contained in recesses in the frame, as shown in Fig. 1.

The frame is secured in the case by means of screws 23 at the rear, and when these screws are removed the entire assembly, including the frame and all the parts carried thereby, may be removed through the front of the case or as readily replaced therein.

The sight opening at the front of inductor 17 constitutes a partial interruption in the magnetic path for flux passing from one pole of the magnet 11 to the other through the indicator, and this might be expected to produce a certain amount of irregularity in the control of the indicator. Since the sight opening does not cut through the lower margin of the inductor, however, this margin affords a continuous path for the flux below the sight opening, and it has been found that with a magnet of ring form, having a uniform clearance from the indicator and the inductor throughout its circumference, the magnet flux is not concentrated in the poles, but is to a large extent distributed throughout the length of the magnet, so that no substantial pulsation is apparent in the indicator even at low speed.

The invention claimed is:

1. In a speedometer, the combination of a conical graduated indicator mounted pivotally on an axis downwardly and rearwardly inclined; a drive shaft coaxial with the indicator; a magnet carried at the upper end of the drive shaft, within the indicator and in a plane near the lower margin thereof; and a stationary inductor, of magnetic sheet-metal, of conical form and coaxial with and surrounding the indicator, the inductor having a lateral sight opening through which the graduations may be seen but being continuous at its lower margin so as to afford a continuous magnetic path in the plane of the magnet.

2. In a speedometer, the combination of a rotary indicator provided with a pivot staff, a frame-member provided with a bearing for one end of the pivot staff, and an arm provided with a bearing for the other end of the pivot staff, said arm being fixed to said frame member but adjustable rotatively about the axis of the pivot staff, and said arm and the indicator having cooperative engaging portions acting as stops for the indicator.

CYRIL T. WALLIS.